(12) United States Patent
Park et al.

(10) Patent No.: US 7,796,015 B2
(45) Date of Patent: Sep. 14, 2010

(54) WIRELESS TERMINAL AND RFID SYSTEM FOR PROVIDING ADDITIONAL INFORMATION AND A METHOD FOR PROVIDING ADDITIONAL INFORMATION USING WIRELESS TERMINAL AND RFID SYSTEM

(75) Inventors: Kyung-ho Park, Suwon-si (KR);
Woo-shik Kang, Suwon-si (KR);
Jin-young Yang, Seoul (KR); Si-gyoung Koo, Seoul (KR); Hyung-min Yoon, Seoul (KR); Ji-hun Koo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1214 days.

(21) Appl. No.: 11/376,332

(22) Filed: Mar. 16, 2006

(65) Prior Publication Data
US 2006/0208860 A1    Sep. 21, 2006

(30) Foreign Application Priority Data
Mar. 16, 2005   (KR)   .................. 10-2005-0021859
May 25, 2005   (KR)   .................. 10-2005-0044074
Jan. 17, 2006   (KR)   .................. 10-2006-0005043

(51) Int. Cl.
*H04Q 5/22*   (2006.01)
(52) U.S. Cl. ................. 340/10.2; 340/10.3; 340/10.4; 340/10.5
(58) Field of Classification Search ............ 340/10.2, 340/10.4, 10.3, 10.5, 825.72
See application file for complete search history.

(56) References Cited

U.S. PATENT DOCUMENTS

| 5,539,394 A | * | 7/1996 | Cato et al. | 340/10.32 |
| 6,078,251 A | * | 6/2000 | Landt et al. | 340/10.41 |
| 6,177,861 B1 | * | 1/2001 | MacLellan et al. | 340/10.1 |
| 7,108,177 B2 | * | 9/2006 | Brookner | 235/382 |

FOREIGN PATENT DOCUMENTS

| EP | 1321889 A2 | 6/2003 |
| JP | 2000298712 A | 10/2000 |
| KR | 2002-0083974 A | 11/2002 |
| KR | 2003-0051410 A | 6/2003 |
| KR | 10-2004-0036117 A | 4/2004 |
| KR | 10-2004-0038791 A | 5/2004 |

* cited by examiner

*Primary Examiner*—Vernal U Brown
(74) *Attorney, Agent, or Firm*—Sughrue Mion, PLLC (57) ABSTRACT

A wireless terminal and a radio frequency identification system for providing additional information and a method of providing additional information using the wireless terminal and the radio frequency identification system. The wireless terminal includes: a tag reader reading tag data from a radio frequency identification tag; a controller generating an additional information request signal with respect to the read tag data; and a communication network interface transmitting the additional information request signal through a communication network and receiving additional information with respect to the additional information request signal. Since the controller of the wireless terminal controls the radio frequency identification reader by optimally setting the information required for determining the time point for the radio frequency identification reader tag to respond, and utilizing the stored address of the additional information providing server, the additional information can be efficiently provided.

21 Claims, 5 Drawing Sheets

WIRELESS TERMINAL AND RFID SYSTEM FOR PROVIDING ADDITIONAL INFORMATION AND A METHOD FOR PROVIDING ADDITIONAL INFORMATION USING WIRELESS TERMINAL AND RFID SYSTEM

CROSS-REFERENCE TO RELATED APPLICATIONS

This application claims priority from Korean Patent Applications No. 2005-21859 filed on Mar. 16, 2005, No. 2005-44074 filed May 25, 2005, and No. 2006-5043 filed on Jan. 17, 2006, in the Korean Intellectual Property Office, the disclosures of which are incorporated herein by reference.

BACKGROUND OF THE INVENTION

1. Field of the Invention

The present invention relates to a wireless terminal and a radio frequency identification (RFID) system for providing additional information and a method of providing additional information using the wireless terminal and the RFID system, and more particularly, to a wireless terminal and an RFID system for providing additional information regarding an RFID tag using the wireless terminal including an RFID reader and a method of providing additional information using the wireless terminal and the RFID system.

2. Description of the Related Art

RFID is a kind of automatic identification and data capture (AIDC) technology reading data from a tag including a microchip using an RF in a non-contact way.

RFID tags are devices attached to various kinds of articles to easily track and identify the articles when the articles moved to other positions. In other words, RFID tags are attached to assets, animals, human beings, and the like so as to automatically identify and track them through RFID readers.

RFID readers may include additional data fixed to identification numbers of objects related to RFID tags generally including programmed information as to the objects.

Conventional bar code systems require passive scanning operations, while RFID systems may automatically identify objects using the above-described information.

Since the RFID systems are capable of automatically identifying and tracking articles as described above, the RFID systems can be applied in various fields such as libraries, the distribution industry such as supermarkets or the like, lending business such as records, books, DVDs, or the like, among others. Thus, the RFID systems can more efficiently manage articles than the conventional bar code system.

In such an RFID system, an RFID reader may receive information regarding an object from an RFID tag. However, the information includes only extremely limited contents. Thus a system for providing detailed information as to articles to which an RFID tag is attached is required.

SUMMARY OF THE INVENTION

Accordingly, the present invention was developed to address the above-mentioned problems, and an aspect of the present invention is to provide a wireless terminal and an RFID system for providing detailed additional information as to a tag through a communication network by installing an RFID reader in the wireless terminal.

According to an aspect of the present invention, there is provided a wireless terminal for providing additional information, comprising a tag reader that reads tag data from a radio frequency identification tag; a controller that generates an additional information request signal with respect to the read tag data; and a communication network interface that transmits the additional information request signal through a communication network and receives additional information with respect to the additional information request signal.

The wireless terminal may further comprise a memory that stores a tag data list comprising the tag data and address information of an additional information providing server corresponding to the tag data.

If the tag data list comprises data coinciding with the read tag data according to a result of comparing the tag data with the tag data list, the controller extracts corresponding address information from the tag data list and generates the address information request signal using the extracted address information.

If the tag data list does not comprise the data coinciding with the read tag data according to the result of comparing the tag data with the tag data list, the controller generates an address information request signal, transmits the address information request signal through the communication network interface to an address information providing server, and generates an additional information request signal using the address information transmitted from the address information providing server.

The wireless terminal may further comprise a display controlled by the controller to display at least one menu.

The controller controls the display to display a menu requesting that a user enter the number of radio frequency identification tags to be identified by the tag reader.

The wireless terminal may further comprise, if there are a plurality of radio frequency identification tags to be identified, an anti-collision executer executing an anti-collision algorithm.

According to another aspect of the present invention, there is provided a method of providing additional information using a wireless terminal, comprising reading tag data from a radio frequency identification tag; generating an additional information request signal with respect to the tag data and transmitting the additional information request signal through a predetermined communication network; and receiving additional information with respect to the additional information request signal.

The method may further comprise storing a tag data list comprising the tag data and address information of an additional information providing server corresponding to the tag data.

If the tag data list comprises data coinciding with the read tag data according to a result of comparing the tag data with the tag data list, corresponding address information is extracted from the tag data list and the additional information request signal is generated using the extracted address information.

If the tag data list does not comprise data coinciding with the read tag data according to the result of comparing the tag data with the tag data list, an address information request signal is generated to transmit the additional information request signal to an address information providing server and the additional information request signal is generated using the address information transmitted from the address information providing server.

The method may further comprise executing an anti-collision algorithm if there are a plurality of radio frequency identification tags to be identified.

According to still another aspect of the present invention, there is provided a radio frequency identification system for providing additional information, comprising a radio frequency identification tag; a wireless terminal that reads tag data from the radio frequency identification tag and requests the additional information with respect to the tag data; and an additional information providing server that provides the additional information in response to the request of the wireless terminal for the additional information.

The radio frequency identification system may further comprise an additional information providing server that provides address information for a connection to the additional information providing server.

The wireless terminal reads the tag data, requests address information from the address information providing server, and requests additional information from the additional information providing server using the address information provided from the address information providing server.

According to yet another aspect of the present invention, there is provided a method of providing additional information using a radio frequency identification system comprising a radio frequency identification tag, a wireless terminal comprising a radio frequency identification reader that identifies the radio frequency identification tag, and an additional information providing server connected to the wireless terminal through a communication network, the method comprising reading tag data from the radio frequency identification tag using the wireless terminal; requesting for additional information with respect to the read tag data using the wireless terminal; and providing the additional information from the additional information providing server to the wireless terminal.

The method may further comprise requesting for address information for a connection to the address information providing server and receiving the address information from an address information providing server using the wireless terminal after reading the tag data.

The request for the additional information is performed using the received address information.

According to yet another aspect of the present invention, there is provided a method of providing additional information using a wireless terminal, comprising computing the number of time slots corresponding to the number of radio frequency identification tags to be identified; transmitting information as to the computed number of time slots to a radio frequency identification tag to set a total number of time slots; and receiving tag data from the radio frequency identification tag within the total number of time slots.

The method may further comprise displaying a menu for inquiring of a user the number of radio frequency identification tags to be identified.

The method may further comprise generating an additional information request signal with respect to the tag data and transmitting the additional information request signal through a communication network; and receiving additional information with respect to the additional information request signal.

According to yet another aspect of the present invention, there is provided a method of providing additional information using a radio frequency identification system comprising a radio frequency identification tag, a wireless terminal comprising a radio frequency identification reader identifying the radio frequency identification tag, and an additional information providing server connected to the wireless terminal through a communication network, the method comprising receiving the number of radio frequency identification tags to be identified from the wireless terminal to compute the number of time slots corresponding to the number of radio frequency identification tags to be identified; transmitting information based on the computed number of time slots and a predetermined command from the wireless terminal to the radio frequency identification tag; setting a total number of time slots and determining a time slot from the set time slots to which the radio frequency identification tag is to respond, with reference to the information using the radio frequency identification tag; and transmitting a result of executing the command within the determined time slot from the radio frequency identification tag.

The method may further comprise requesting additional information with respect to the result of the executing the command using the wireless terminal, and providing the additional information from the additional information providing server to the wireless terminal.

The method may further comprise, after the wireless terminal receives the result of executing the command, requesting address information for a connection to the additional information providing server and receiving the address information from an address information providing server.

The request for the additional information is performed using the received address information.

A wireless terminal according to yet another aspect of the present invention comprises a wireless terminal controller that controls operations of the wireless terminal and sets information as to the number of time slots required for determining the number of time slots to be generated by an RFID tag; and a tag reader that transmits the information as to the number of time slots set by the wireless terminal controller to the RFID tag.

The controller of wireless terminal controller sets the information Q as to the number of time slots based on a following equation:

$$Q = \log_2(\text{optimum number of time slots} + 1)$$

The optimum number of time slots comprises one of a number input by a user and a preset number.

When being currently operated in a 'mode for reading the RFID tag required to determine the number of time slots', the wireless terminal controller sets the information Q as to the number of time slots to one of valid values, and when in a 'mode for reading the RFID tag not required to determine the number of time slots', sets the information Q as to the number of time slots to a meaningless value.

If it is determined that the tag reader failed to read the RFID tag within a predetermined time, the wireless terminal controller increases the information Q as to the number of time slots.

According to yet another aspect of the present invention, there is provided a tag reading device comprising a control module that controls operations thereof and sets information as to the number of time slots required for determining the number of time slots to be generated by an RFID tag; and a transception module that transmits the information as to the number of time slots set by the control module to the RFID tag.

The control module sets the information Q as to the number of time slots using a following equation:

$$Q = \log_2(\text{optimum number of time slots} + 1)$$

The optimum number of time slots is one of a number input by a user and a preset number.

When being currently operated in a 'mode for reading the RFID tag required to determine the number of time slots', the control module sets the information Q, as to the number of time slots, to one of a valid value, and when in a 'mode for reading the RFID tag not required to determine the number of time slots', sets the information Q, as to the number of time slots, to a meaningless value.

When it is determined that the tag reader failed to read the RFID tag within a predetermined time, the control module increases the information Q as to the number of time slots.

According to yet another aspect of the present invention, there is provided a method for reading an RFID tag information, comprising setting information as to the number of time slots required for determining the number of time slots to be generated by an RFID tag; and transmitting the set information Q as to the number of time slots to the RFID tag.

In the setting step, the information Q as to the number of time slots is set using a following equation:

$$Q = \log_2(\text{optimum number of time slots} + 1)$$

The optimum number of time slots comprises one of a number input by a user and a preset number.

In the setting step, when a current operation mode is a 'mode for reading the RFID tag required to determine on the number of time slots', the information Q, as to the number of time slots, is set to one of valid values, and when a 'mode for reading the RFID tag not required to determine on the number of time slots', the information Q, as to the number of time slots, is set to a meaningless value.

The method may further comprise increasing the information Q as to the number of time slots when it is determined that the tag reader failed to read the RFID tag within a predetermined time.

According to yet another aspect of the present invention, there is provided a wireless terminal which sets information as to the number of time slots required for determining the number of time slots to be generated by an RFID tag.

The set information regarding the number of time slots is transmitted to the RFID tag.

According to yet another aspect of the present invention, there is provided a tag reading device which sets information as to the number of time slots required for determining the number of time slots to be generated by an RFID tag.

The set information regarding the number of time slots is transmitted to the RFID tag.

According to yet another aspect of the present invention, there is provided a method for reading RFID tag information, which sets information as to the number of time slots required for determining the number of time slots to be generated by an RFID tag.

The set information regarding the number of time slots is transmitted to the RFID tag.

According to yet another aspect of the present invention, there is provided a tag reading device which transmits information as to the number of time slots required for determining the number of time slots to be generated by an RFID tag.

According to yet another aspect of the present invention, there is provided a method for reading RFID tag information, which transmits information as to the number of time slots required for determining the number of time slots to be generated by an RFID tag.

According to yet another aspect of the present invention, there is provided a wireless terminal for providing additional information, comprising a memory storing a tag data list comprising information as to tag data read from an RFID tag and address information of an additional information providing server corresponding to the tag data information; and a controller that extracts corresponding address information from the tag data list and generates an additional information request signal using the extracted address information if the tag data list includes data coinciding with the information as to the read tag data information.

The wireless terminal may further comprise a communication network interface that transmits the generated additional information requesting signal through the communication network and receives the additional information in response to the requesting signal, and wherein the controller that generates an address information requesting signal and transmits the requesting signal to the address information providing server through the communication network interface if the tag data list does not include data coinciding with the information as to the read tag data information, and generates an additional information requesting signal using the address information transmitted from the address information providing server.

The tag data information comprises one of tag data and a service code read from the RFID tag.

The address information of the additional information providing server is acquired from one of the RFID tag and the address information providing server.

According to yet another aspect of the present invention, there is provided a method for providing additional information to a wireless terminal, comprising storing a tag data list comprising information as to tag data read from an RFID tag and address information of an additional information providing server corresponding to the tag data information; and extracting corresponding address information from the tag data list if the tag data list includes data coinciding with the information as to the read tag data information; and generating an additional information request signal using the extracted address information.

The method may further comprise generating an address information requesting signal and transmitting the requesting signal to the address information providing server if the tag data list includes data coinciding with the information as to the read tag data information; and generating an additional information requesting signal using the address information transmitted from the address information providing server.

The tag data information comprises one of tag data and a service code read from the RFID tag.

The address information of the additional information providing server is acquired from one of the RFID tag and the address information providing server.

BRIEF DESCRIPTION OF THE DRAWINGS

The above aspects and features of the present invention will be more apparent by describing exemplary embodiments of the present invention with reference to the accompanying drawings, in which.

DETAILED DESCRIPTION OF THE EXEMPLARY EMBODIMENTS

Certain exemplary embodiments of the present invention will be described in greater detail with reference to the accompanying drawings.

In the following description, same drawing reference numerals are used for the same elements even in different drawings. The matters defined in the description, such as a detailed construction and elements, are merely provided to assist in a comprehensive understanding of the invention. Thus, it is apparent that the present invention can be carried out without those defined matters. Well-known functions or constructions are not described in detail since they would obscure the invention in unnecessary detail.

Figure 1:
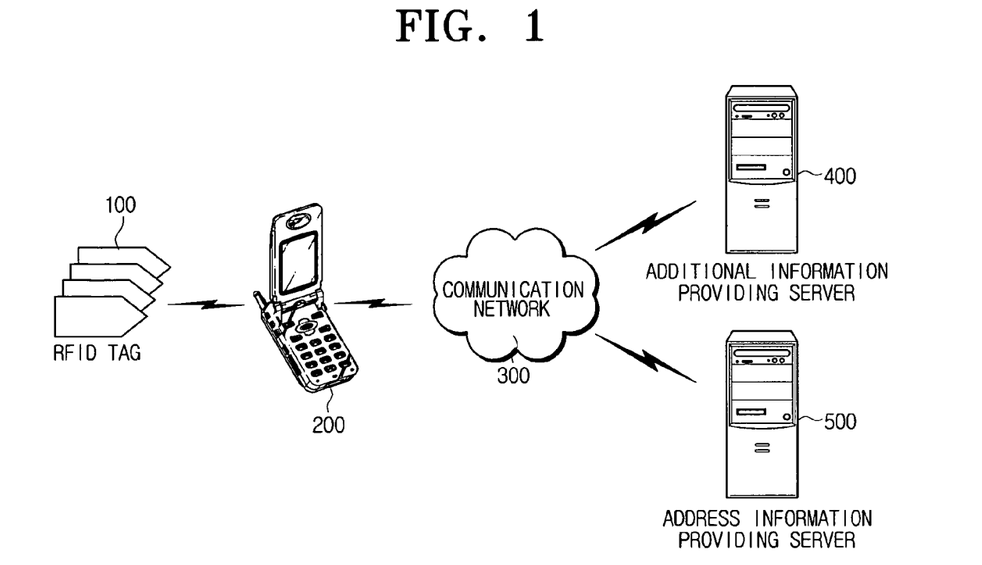
FIG. 1 is a view illustrating a configuration of an RFID system for providing additional information according to an exemplary embodiment of the present invention.

FIG. 1 is a view illustrating a configuration of an RFID system for providing additional information according to an exemplary embodiment of the present invention.

An RFID system according to an exemplary embodiment of the present invention includes an RFID tag 100, a wireless terminal 200 including an RFID reader, an additional information providing server 400 connected to the wireless terminal 200 through a communication network 300 to provide additional information, and an address information providing server 500 connected to the wireless terminal 200 through the communication network 300 to provide information regarding an address of the additional information providing server 400.

The RFID tag 100 may be generally installed in various types of objects and thus frequently move to another position. If the RFID tag 100 is positioned in a range within which the RFID reader emits an electromagnetic wave, the RFID tag 100 receives the electromagnetic wave from the RFID reader. For example, the RFID tag 100 may be installed at medicines, books, records, DVDs, movie posters, etc.

The wireless terminal 200 includes the general RFID reader for identifying the RFID tag 100 and is a portable wireless terminal such as a mobile phone, a personal digital assistant (PDA), etc.

In general, the RFID reader continuously emits the electromagnetic wave using an antenna, and the electromagnetic wave is transmitted to at least one RFID tag 100 within the electromagnetic wave of the RFID reader.

The wireless terminal 200, including the RFID reader, identifies the RFID tag 100 to read tag data, requests and receives additional information as to the tag data, and executes the additional information so as to provide the additional information to a user.

In a case where the wireless terminal 200 includes the address information of the additional information providing server 400, the wireless terminal 200 may directly request the additional information providing server 400 for the additional information. In a case where the wireless terminal 200 does not include the address information of the additional information providing server 400, the wireless terminal 200 may request the address information providing server 500, for the address information of the additional information providing server 400 and request the additional information providing server 400 for the additional information using the address information provided from the address information providing server 500. The wireless terminal 200 will be described in more detail later with reference to FIG. 2.

The additional information providing server 400 is connected to the wireless terminal 200 through the communication network 300 to transmit and/or receive data. The additional information providing server 400 provides predetermined additional information in response to the request of the wireless terminal 200 for the additional information.

For example, in a case where the RFID tag 100 is attached to a medicine, the additional information providing server 400 may provide information as to an ingredient, a taking method, and a side effect of the medicine. In a case where the RFID tag 100 is attached to a record, the additional information providing server 400 may provide a main music video of the record.

The address information providing server 500, is connected to the wireless terminal 200 through the communication network 300 to transmit and/or receive data. The address information providing server 500, provides the address information for accessing the additional information providing sever 400 in response to the request of the wireless terminal 200 for the address information. Here, the address information may be an Internet Protocol (IP) address of the additional information providing server 400.

Figure 2:
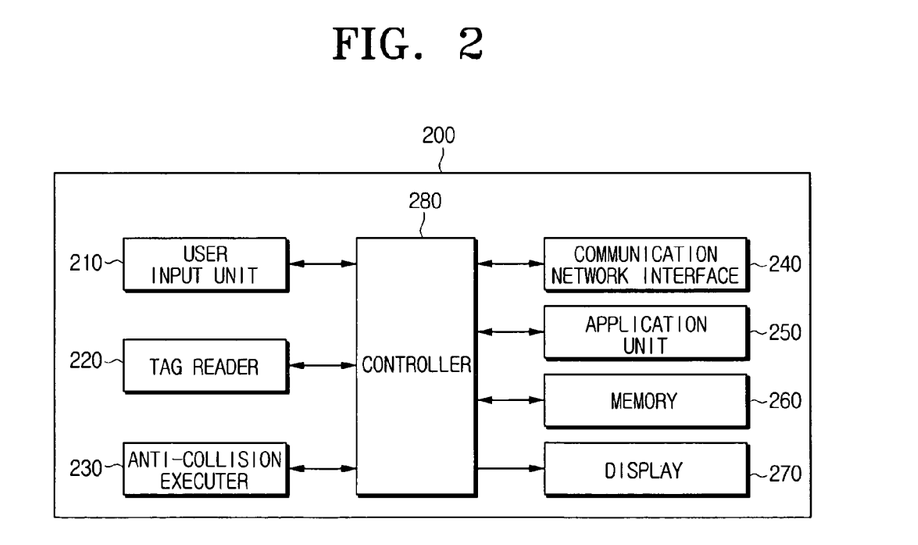
FIG. 2 is a block diagram of a wireless terminal for providing additional information according to an exemplary embodiment of the present invention.

FIG. 2 is a block diagram of a wireless terminal according to an exemplary embodiment of the present invention.

The wireless terminal 200 according to an exemplary embodiment of the present invention includes a user input unit 210 a tag reader 220, an anti-collision executer 230, a communication network interface 240, an application unit 250, a memory 260, a display 270, and a controller 280.

The user input unit 210 inputs a request signal through a manipulation of a user to the controller 280 that will be described later. In the present embodiment, the request signal input through the user input unit 210 to the controller 280 may be a tag identification request signal that will be input through a function key of the wireless terminal 200 or a combination of a plurality of function keys of the wireless terminal 200.

The tag reader 220 functions as the general RFID reader for identifying the RFID tag 100. The tag reader 220 identifies the RFID tag 100 by reading the tag data and provides the tag data to the controller 280.

If a plurality of RFID tags 100 to be identified by the tag reader 220 exist, the anti-collision executer 230 executes an anti-collision algorithm that has been known to prevent collisions among the plurality of RFID tags 100.

The communication network interface 240 connects the additional information providing server 400 or the address information providing server 500, to the wireless terminal 200 through the communication network 300. The communication network interface 240 may transmit an additional information request signal generated by the controller 280 to the additional information providing server 400 through the communication network 300 and receive the additional information from the additional information providing server 400 to provide the additional information to the controller 280. The communication network interface 240 may also transmit an address information request signal generated by the controller 280 to the address information providing server 500, through the communication network 300 and receive the address information from the address information providing server 500, to provide the address information to the controller 280.

The application unit 250 executes the additional information provided through the communication network interface 240 from the additional information providing server 400 to provide the additional information to the user.

The memory 260 stores a tag data list including a kind of the tag data parsed and processed by the controller 280 and the address information of the additional information providing server corresponding to the tag data. Table 1 below exemplarily shows the tag data list stored in the memory 260.

TABLE 1

| Tag data | Address Information of additional information providing server |
|---|---|
| A-Movie | IP: 123.73.91.1/Port: 8081 |
| B-Song | IP: 201.211.173.1/Port: 255 |
| C-Beef | IP: 52.192.3.1/Port: 80 |
| A-Song | IP: 123.73.200.1/Port: 4000 |

The display 270 is controlled by the controller 280 to display information to be provided to the user. For example, if the user sends a tag identification request signal through the user input unit 210 the display 270 may be controlled by the controller 280 to display contents to select whether the tag reader 220 identifies one or a plurality of tags. The display 270 may also be controlled by the controller 280 to display the additional information provided from the additional information providing server 400.

The controller 280 controls the overall operation of the wireless terminal 200. In other words, the controller 280 controls inputs and outputs of signals to the user input unit 210 the tag reader 220 the anti-collision executer 230 the communication network interface 240, the application unit 250, the memory 260, and the display 270

The controller 280 controls the display 270 to display a menu to inquire the number of RFID tags to be identified by the tag reader 220 of the user. Thus, if the user selects a plurality of RFID tags to be identified on the menu, the controller 280 controls the anti-collision executer 230 to execute the anti-collision algorithm. If the user selects one RFID tag to be identified on the menu, the anti-collision algorithm does not need to be executed, and thus the controller 280 controls the tag reader 220 to identify the RFID tag 100.

If a plurality of RFID tags to be identified exists on the menu, the anti-collision algorithm is executed.

If the tag reader 220 reads the tag data, the controller 280 parses the tag data. The tag data may comprise "A-Movie," "B-Song," "C-Beef," and "A-Song", for example, as shown in Table 1.

The controller 280 compares the parsed tag data with the tag data list stored in the memory 260 to determine whether coinciding data exists.

If the controller 280 determines that the coinciding data exists as a result of the comparison between the newly read tag data with the tag data listed on the tag data list, the controller 280 extracts address information of the corresponding additional information providing server from the tag data list and generates the additional information request signal using the extracted address information.

As a result, the communication network interface 240 may be connected to the additional information providing server 400 using the address information of the additional information request signal.

Referring to Table 1, if the newly read tag data is "A-Movie", the communication network interface 240 may be connected to the additional information providing server 400 using address information of the additional information providing server "123.73.91.1/Port:8081" of "A-Movie" without being provided with the address information of the additional information providing server 400 from the additional information providing server 500. Thus, a process of connecting the communication network interface 240 to the address information providing server 500, may be omitted, and thus communication cost and usage time can be reduced.

If the controller 280 determines that the coinciding data does not exist as a result of comparison between the newly read tag data with the tag data listed on the tag data list, the controller 280 generates the address information request signal. The controller 280 controls the communication network interface 240 to transmit the address information request signal to the address information providing server 500, and the communication network interface 240 receives the address information of the additional information providing server from the address information providing server 500, to provide the address information to the controller 280.

The controller 280 receives the address information and then generates the additional information request signal using the received address information. Thus, the communication network interface 240 may be connected to the additional information providing server 400 using the address information of the additional information request signal.

Figure 3:
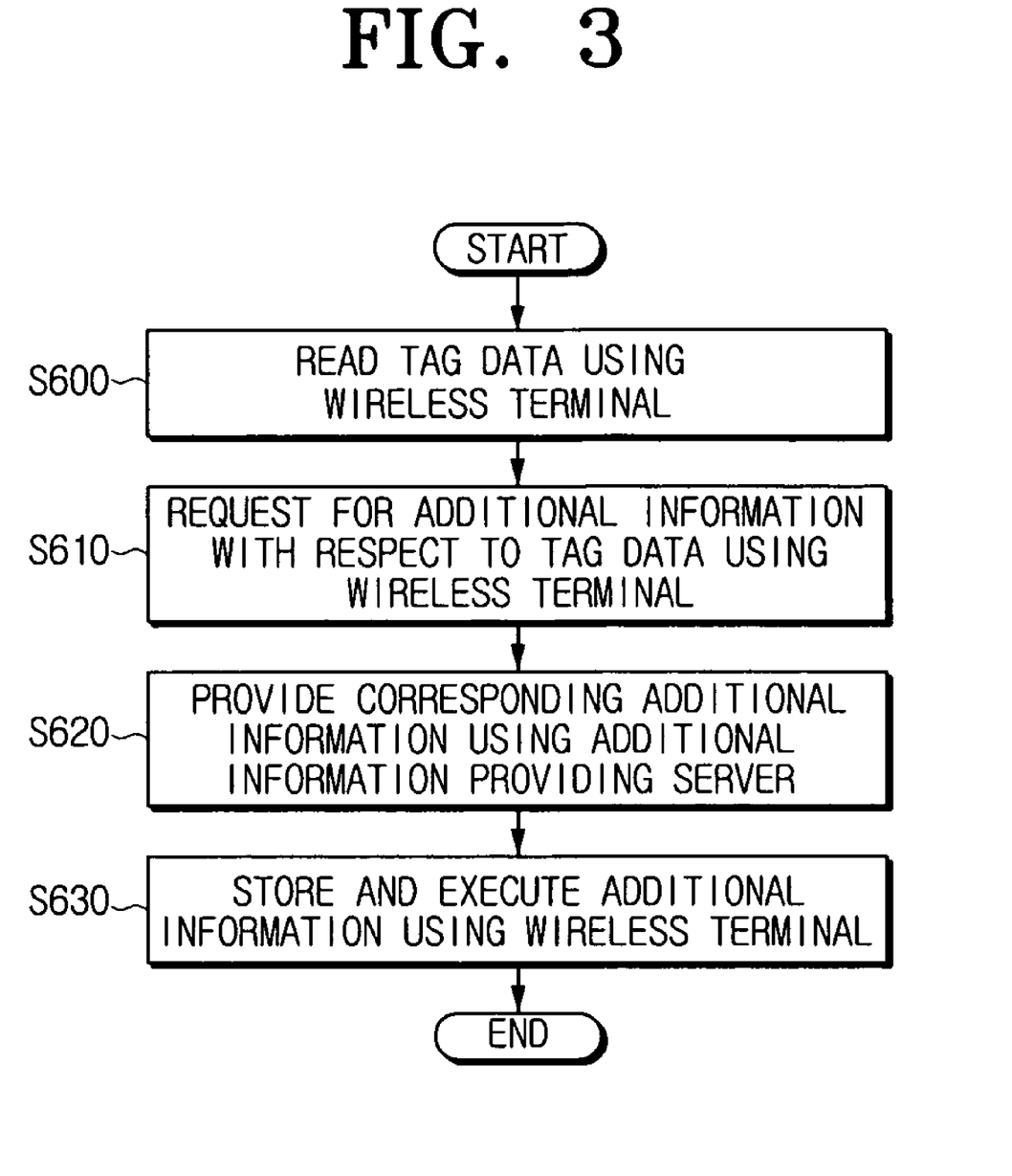
FIG. 3 is a flowchart of a method of providing additional information using an RFID system according to an exemplary embodiment of the present invention.

FIG. 3 is a flowchart of a method of providing additional information using an RFID system according to an exemplary embodiment of the present invention. Here, the method will be described with reference to FIGS. 1 through 3. However, there will be described a case where the RFID system includes only the RFID tag 100, the wireless terminal 200, and the additional information providing server 400 so as to describe a basic configuration of the RFID system.

In operation S600, the tag reader 220 of the wireless terminal 200 identifies the RFID tag 100 to read the tag data. Here, the tag reader 220 operates if the user requests to identify the RFID tag 100 or if the RFID tag 100 exists within the electromagnetic wave range of the wireless terminal 200.

In operation S610, the controller 280 generates the additional information request signal and then transmits the additional information request signal through the communication network interface 240 to request the additional information.

In operation S620, the additional information providing server 400 receives the additional information request signal from the wireless terminal 200 and provides the corresponding additional information through the communication network 300 to the wireless terminal 200.

In operation S630, the wireless terminal 200 receives the additional information from the additional information providing server 400 through the communication network interface 240, and the application unit 250 executes the additional information under the control of the controller 280 to provide the additional information to the user. Here, the memory 260 may selectively store the additional information.

Figure 4:
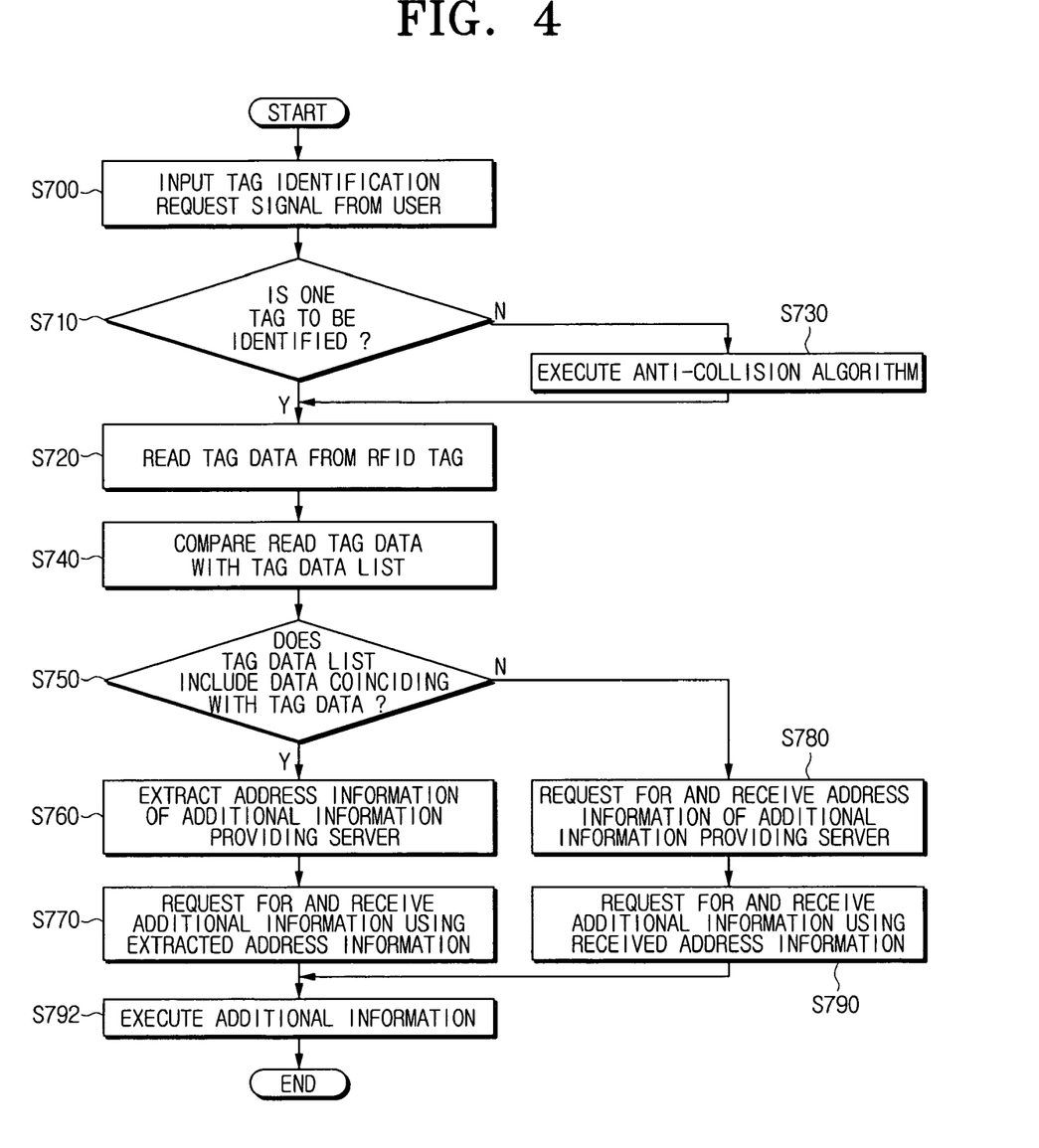
FIG. 4 is a flowchart of a method of providing additional information using a wireless terminal according to an exemplary embodiment of the present invention.

FIG. 4 is a flowchart of a method of receiving additional information using a wireless terminal according to a preferred embodiment of the present invention. Here, a method of receiving additional information using the wireless terminal 200 will be described with reference to FIGS. 1 through 4.

In operation S700, the user requests for identifying the RFID tag 100 by manipulating the function key of the wireless terminal 200 to input the tag identification request signal through the user input unit 210 to the controller 280.

In operation S710, the controller 280 controls the display 270 to display the menu through which the user selects whether to identify one or a plurality of RFID tags 100. If the user selects one RFID tag 100 to be identified in operation S710, the tag reader 220 identifies the RFID tag 100 to read the tag data in operation S720.

If the user selects the plurality of RFID tags 100 to be identified in operation S710, in operation S730, the controller 280 controls the anti-collision executer 230 to execute the anti-collision algorithm so as to prevent collisions among the plurality of RFID tags 100. Next, the tag reader 220 reads the tag data from the RFID tag 100 in operation S720.

In operation S740, the controller 280 parses the read tag data and compares the tag data with the tag data list stored in the memory 260.

In operation S750, the controller 280 determines whether the tag data list stored in the memory 260 includes data coinciding with the newly read tag data. If the controller 280 determines in operation S750 that the tag data list includes the data coinciding with the tag data, the controller 280 extracts the corresponding data from the tag data list in operation S760.

In operation S770, the controller 280 generates the additional information request signal using the extracted address information and requests the additional information providing server 400 for the additional information corresponding to the extracted address information through the communication network interface 240, and the communication network interface 240 receives the additional information from the additional information providing server 400.

If the controller 280 determines in operation S750 that the tag data list does not include the data coinciding with the newly read tag data, then, in operation S780, the controller 280 generates the address information request signal and controls the communication network interface 240 to transmit the address information request signal to the address information providing server 500, and the address information providing server 500, provides the corresponding address information to the wireless terminal 200.

In operation S790, the controller 280 generates the additional information request signal using the address information provided from the address information providing server 500, and requests the additional information providing server 400 corresponding to the address information for the additional information through the communication network interface 240.

The additional information providing server 400 receives the additional information request signal from the wireless terminal 200 and provides the additional information to the wireless terminal 200, and the communication network interface 240 receives the additional information from the additional information providing server 400.

In operation S792, the wireless terminal 200 receives the additional information from the additional information providing server 400, the application unit 250 executes the additional information under the control of the controller 280, and the display 270 displays the additional information to provide the additional information to the user.

As described above, a wireless terminal such as a mobile phone or a PDA may be connected to the communication network 300 so as to be connected to the additional information providing server 400 and the address information providing server 500. Thus, the wireless terminal 200 may be provided with various kinds of additional information besides basic information from the RFID tag 100.

Although the memory 260 of the present embodiment stores the tag data list including the tag data parsed and processed by the controller 280 and the corresponding address information, such as URL information, of the additional information providing server 400, the tag data list stored in the memory 260 of the present invention is not limited to this.

As another example for the tag data list, the tag data list may include a service code stored in the RFID tag 100 and the corresponding address information of the additional information providing server. Such a tag data list is illustrated in Table 2 as below.

TABLE 2

| Service code | Address information of additional information providing server |
|---|---|
| 12.34.56.78 | IP: 123.73.91.1/Port: 8081 |
| 23.45.67.89 | IP: 201.211.173.1/Port: 255 |
| 34.56.78.9A | IP: 52.192.3.1/Port: 80 |
| 45.67.89.AB | IP: 123.73.200.1/Port: 4000 |

In addition, the wireless terminal 200 according to the present embodiment acquires the address information from the address information providing server 500. However, the present invention is not limited to this, but may be configured in other ways. For example, the address information with respect to the additional information providing server 400 that provides the additional information concerning articles wearing the RFID tag 100 may be stored in a memory (not shown) provided to the RFID tag 100, so that the wireless terminal 200 acquires the address information of the additional information providing server from the RFID tag 100.

In a case where an RFID reader installed in a mobile phone reads a tag, there is required a method of reducing a time required for identifying tags and power consumption of the mobile phone. In particular, if an ALOHA method is used as an anti-collision algorithm, only one tag responds to a last time slot. Thus, unnecessary standby time occurs.

In other words, a stationary RFID reader cannot know about the number of tags to be identified. Thus if the ALOHA method is used as the anti-collision algorithm, unnecessary standby time occurs. For example, if the number of time slots is "8" from T1 to T8 and a tag responds to the time slot T8, the stationary RFID reader must wait for a time from t1 to t7 corresponding to T1 through T7.

However, if an RFID reader is installed in a portable terminal, a user may accurately determine or estimate the number of tags to be identified using the RFID reader and optimize the number of slots generated by the tags so as to reduce unnecessary standby time.

The RFID tags include an RFID tag that transmits its own tag data to the RFID reader using one of the plurality of time slots.

In order to select one of the plurality of time slots, the tag needs to determine the number of the time slots. The tag uses information as to the number of time slots received from the RFID in determining the number of time slots.

Considering that the user of the wireless terminal having the RFID reader correctly or roughly presume the number of tags to be recognized as its RFID reader, another exemplary embodiment can be drawn, which is capable of reducing time required for identifying a tag when reading the tag data stored in the RFID tag transmitting its tag data to the RFID reader using one of the plurality of time slots. According to this embodiment, the number of time slots used for transmission of the tag data by the RFID tag can be varied. This embodiment will be described in greater detail hereinafter.

Figure 5:
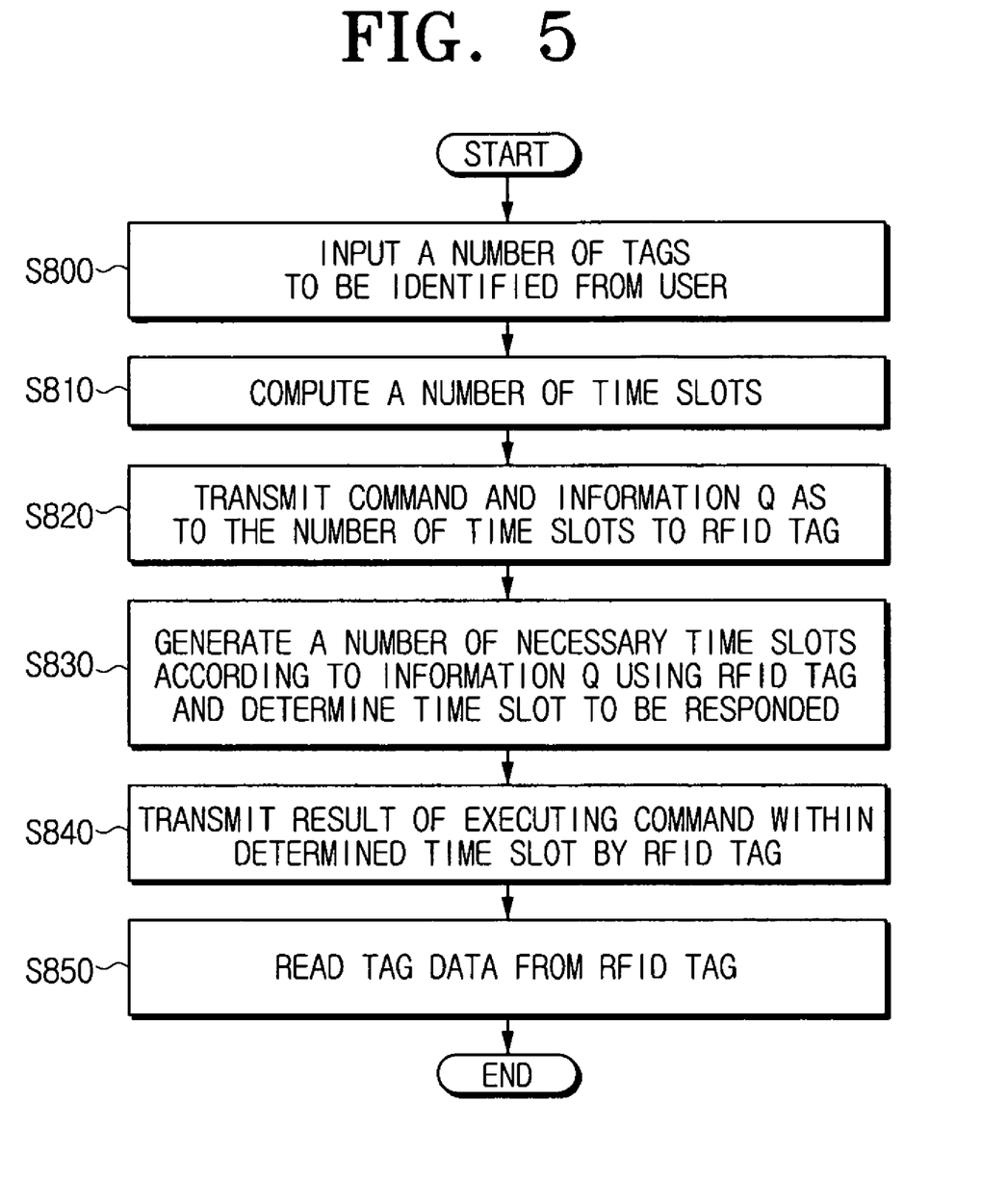
FIG. 5 is a flowchart of a method of reducing a time required for identifying a tag using a wireless terminal according to an exemplary embodiment of the present invention.
Figure 6:
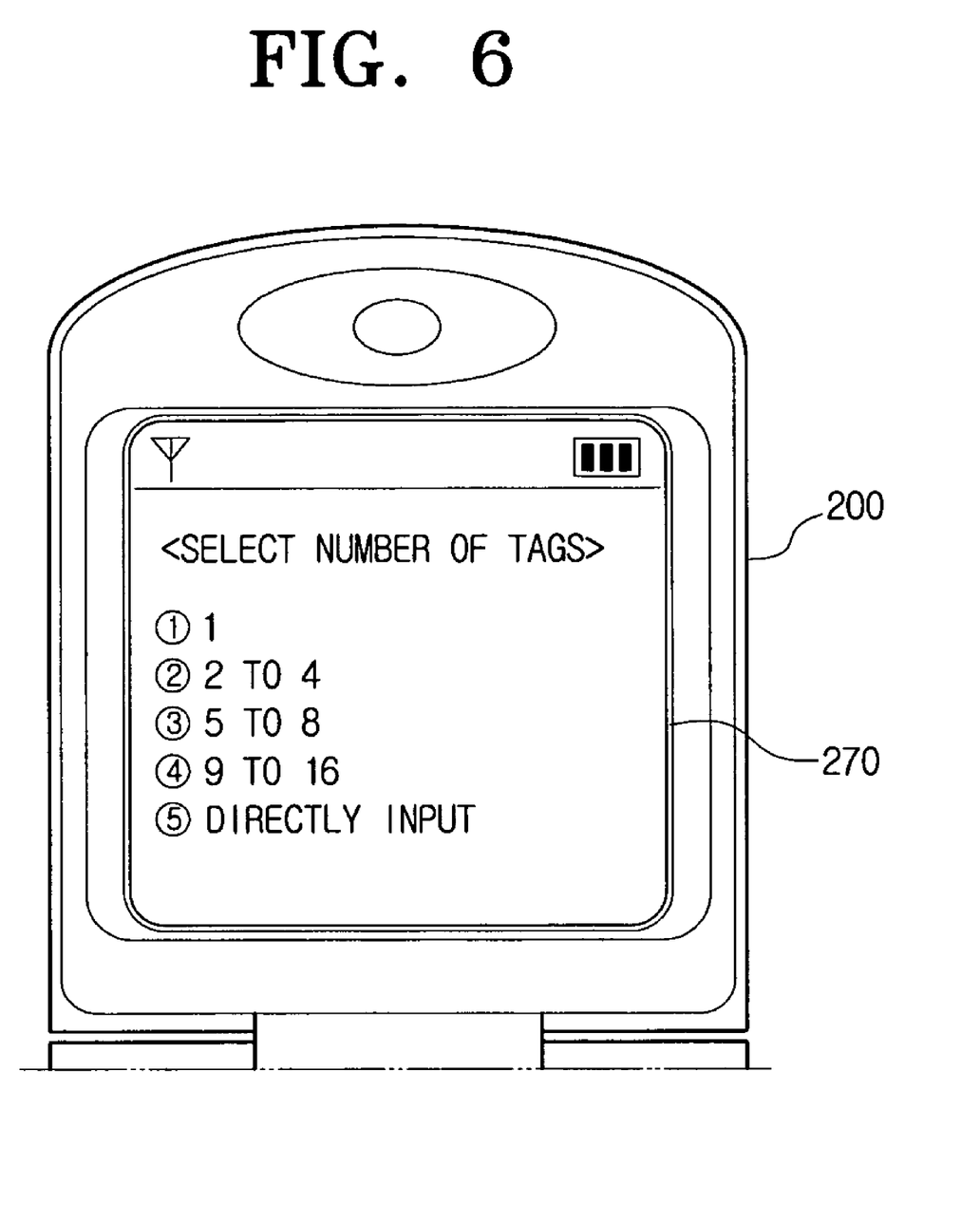
FIG. 6 is a view illustrating an example of a menu through which a user can select the number of tags to be identified.

FIG. 5 is a flowchart of a method of reducing a time required for identifying a tag using a wireless terminal according to an exemplary embodiment of the present invention. Referring to FIGS. 2 and 5, the controller 280 controls the display 270 to display the menu through which the user selects the number of tags to be identified. FIG. 6 is a view illustrating an example of a menu through which a user selects the number of tags to be identified. In operation S800, the user refers to the menu to select the number of tags to be identified so as to input the number of tags to be identified. In the present embodiment, the number of tags to be identified is selected through a menu. However, this embodiment is exemplary, and thus, the present invention is not limited to this. In other words, the number of tags to be identified may be input via a specific figure button of the user input unit 210 of the wireless terminal 200, voice, or the like.

If the user inputs the number of tags to be identified in operation S800, the controller 280 computes the number of optimal time slots to which the RFID tag 100 is to respond in operation S810. For example, if the number of tags to be identified is "1," the number of optimal time slots may be "1." If the number of tags to be identified is "2" to "4," the number of optimal time slots may be "4." If the number of tags to be identified is "5" to "8," the number of optimal time slots may be "8." If the number of tags to be identified is "9" to "16," the number of optimal time slots may be "16." If the user directly inputs the number of tags to be identified, the number of optimal time slots corresponding to the number of tags may be generated. If the user does not input the number of tags to be identified, the number of optimal time slots may be computed using a set number of tags. Here, the set number of tags may be automatically changed by collecting numbers of tags read by the tag reader 220 in the unit of specific period or in the unit of the number of usage times to compute an average of the numbers or may be determined as the number of time slots by computing the minimum or the maximum value. Besides, the number of time slots may be determined as a random number within a range of the number of valid time slots, an average of the numbers previously used, or the number that has not been previously used.

In addition, the number transmitted from an external system may be determined as the number of time slots. For example, in a case where a user carrying a wireless terminal mounting an RFID reader enters a museum, the number transmitted from an external system installed at the museum may be determined as the number of time slots. In this case, communication between the wireless terminal and the system of the museum can be achieved through a general wireless communication system.

Information as to positions (physical position, logical position) where the RFID reader was previously used and the number of time slots used in the positions may be stored, so that when using the RFID reader later, the pre-stored number of time slots corresponding to positions for using the RFID reader can be determined as the optimum number of time slots.

In operation S820, the tag reader 220 transmits a command to the RFID tag 100 together with information Q as to the number of time slots. The information Q as to the number of time slots is used in determining the number of time slots to be generated by the RFID tag 100 and set by the controller 280. The controller 280 may compute the information Q as to the number of time slots using the optimum number of time slots obtained through step S810 and using Equations 1 and 2 as below:

$$\text{optimum number of time slots} = 2^Q - 1 \quad \text{[Equation 1]}$$

$$Q = \log_2(\text{optimum number of time slots} + 1) \quad \text{[Equation 2]}$$

Here, Q may be integral numbers between 0 and 15. However, the range of Q is not limited so. Moreover, the information Q as to the number of time slots can be set in different ways instead of using the optimum number of time slots and Equations 1 and 2.

In operation S830, the RFID tag 100 generates the number of necessary time slots using the information Q and determines a time slot to which the RFID tag 100 is to respond. Here, the RFID tag 100 generates the required number of time slots using the information Q as to the number of the transmitted time slots and Equation 3 as below:

$$\text{required number of time slots} = 2^Q - 1 \quad \text{[Equation 3]}$$

The time slot to which the RFID tag 100 is to respond may be determined randomly.

In operation S840, the RFID tag 100 transmits the result of the command to the determined time slot. In operation S850, the tag reader 220 reads the tag data from the RFID tag 100. Thereafter, as described with reference to FIG. 4, the RFID tag 100 may optimally generate the number of time slots to be generated to reduce unnecessary standby time and accordingly reduce a time required for identifying tags and power consumption of the wireless terminal 200.

If the tag reader 220 failed to read the tag data transmitted from the RFID tag 100 in step S850, that is, if it is determined that the tag reader 220 failed to read the tag data from the RFID tag 100, the controller 280 increases the information Q as to the number of time slots and performs the processes from S820 again.

For example, when the preset information Q as to the number of time slots is 4, the controller 280 sets the information Q as to the number of time slots to 5 and performs processes from S820 again. This is to decrease possibility that a plurality of RFID tags 100 determine the same time slot, by increasing the number of time slots selectable by the RFID tags 100 existing around the tag reader 220.

The controller 280 may be designed to increase the information Q as to the number of time slots in case that the tag reader 220 fails to read the tag data equal to or more than twice (for example, three times).

The method for the wireless terminal to read the tag data from 'the RFID tag required to determine the number of time slots in transmitting the tag data' has been explained so far with reference to FIG. 5.

The operations of the flowchart of FIG. 5 are performed by the wireless terminal under the control of the controller 280, when the wireless terminal is currently operating in a 'mode for reading the RFID tag required to determine the number of time slots'.

When the wireless terminal is currently operating in a 'mode for reading the RFID tag not required to determine the number of time slots', the controller 280 may set the information Q as to the number of time slots to a meaningless value, for example, a negative number, so that the information Q as to the number of time slots cannot be transmitted to the RFID tag 100, or although the RFID tag 100 receives the information Q as to the number of time slots, the RFID tag 100 does not refer to the information Q as to the number of time slots.

According to the exemplary embodiments as described above, the controller 280 provided to the wireless terminal sets the information Q as to the number of time slots.

Although not shown, however, in case that the tag reader 220 comprises a control module (not shown) controlling the overall operations thereof and a transception module (not shown) receiving/transmitting the data with the RFID tag 100, the control module of the tag reader 220 may generate the information Q as to the number of time slots.

More specifically, the control module of the tag reader 220 computes the information Q as to the number of time slots using the optimum number of time slots transmitted from the controller 280 and Equations 1 and 2. When transmitting a command to the RFID tag 100, the transception module of the tag reader 220 also transmits the information Q as to the number of time slots set by the control module.

According to the present invention, the tag reader 220 may be separated configured. More particularly, the tag reader 220 may be implemented as hardware in the form of a tag reader module or a chip mounted to the wireless terminal 200, and also implemented in the form of an accessory detachable from the wireless terminal 200. The separately formed tag reader 220 may include or exclude the control module.

FIG. 6 shows an illustrative example of a menu on the display 270 of the wireless terminal 200 according to an exemplary embodiment of the present invention. The user can select the number of tags to be identified by following the menu.

As described above, in a wireless terminal, an RFID system, and a method for providing additional information according to the present invention, the wireless terminal including an RFID reader can be connected to an additional information providing server and an address information providing server through a communication network. Thus, the wireless terminal can be provided with detailed additional information as to an RFID tag providing simple, basic information.

Also, when the controller of the wireless terminal controls the RFID reader, the information required for determining the time point for the RFID tag to respond can be optimally set. Thus, the number of tags to be identified can be input from a user to generate the number of optimal time slots. Thus, unnecessary standby time and power consumption of the wireless terminal can be reduced.

Also, the additional information can be efficiently offered by storing and utilizing the address of the additional information providing server. That is, tag data read from the RFID tag can be classified to store a tag data list and when similar kinds of tag data are input, communication cost and usage time can be saved by using the similar kinds of tag data.

The foregoing embodiments are merely exemplary and are not to be construed as limiting the present invention. The present teaching can be readily applied to other types of apparatuses. Also, the descriptions of the exemplary embodiments of the present invention are intended to be illustrative, and not to limit the scope of the claims, and many alternatives, modifications, and variations will be apparent to those skilled in the art.

What is claimed is:

1. A wireless terminal for providing additional information, comprising:
   a tag reader which reads tag data from a radio frequency identification tag;
   a controller which generates an additional information request signal with respect to the read tag data;
   a communication network interface which transmits the additional information request signal through a communication network and receives the additional information in response to the additional information request signal; and
   a memory which stores a tag data list comprising the tag data and address information of an additional information providing server corresponding to the tag data;
   wherein if the tag data list does not comprise the data coinciding with the read tag data according to the result of comparing the tag data with the tag data list, the controller generates an address information request signal, transmits the address information request signal through the communication network interface to an address information providing server, and generates the additional information request signal using the address information transmitted from the address information providing server.

2. The wireless terminal of claim 1, wherein if the tag data list comprises data coinciding with the read tag data according to a result of comparing the tag data with the tag data list, the controller extracts corresponding address information from the tag data list and generates the address information request signal using the extracted address information.

3. The wireless terminal of claim 1, further comprising:
   a display controlled by the controller which displays at least one menu.

4. The wireless terminal of claim 3, wherein the controller controls the display to display a menu for inquiring of a user the number of radio frequency identification tags to be identified by the tag reader.

5. The wireless terminal of claim 4, further comprising:
   an anti-collision executer which executes an anti-collision algorithm if there are a plurality of radio frequency identification tags to be identified.

6. A method of providing additional information using a wireless terminal, comprising:
   reading tag data from a radio frequency identification tag;
   generating an additional information request signal with respect to the tag data and transmitting the additional information request signal through a predetermined communication network;
   receiving the additional information in response to the additional information request signal; and
   storing a tag data list comprising the tag data and address information of an additional information providing server corresponding to the tag data;
   wherein if the tag data list does not comprise the data coinciding with the read tag data according to the result of comparing the kind of the tag data with the tag data list, generating an address information request signal to transmit the additional information request signal to an address information providing server and generating the additional information request signal using the address information transmitted from the address information providing server.

7. The method of claim 6, wherein if the tag data list comprises data coinciding with the read tag data according to a result of comparing the tag data with the tag data list, extracting corresponding address information from the tag data list and generating the additional information request signal using the extracted address information.

8. The method of claim 6, further comprising:
   before reading the tag data, inquiring of a user the number of radio frequency identification tags to be identified.

9. The method of claim 8, further comprising:
   executing an anti-collision algorithm if there are a plurality of radio frequency identification tags to be identified.

10. A radio frequency identification system for providing additional information, comprising:
    a radio frequency identification tag;
    a wireless terminal which reads tag data from the radio frequency identification tag and requests for the additional information with respect to the tag data;
    an additional information providing server which provides the additional information in response to the request of the wireless terminal for the additional information; and
    a memory which stores a tag data list comprising the tag data and address information of the additional information providing server corresponding to the tag data;
    wherein if the tag data list does not comprise the data coinciding with the read tag data according to the result of comparing the tag data with the tag data list, the controller generates an address information request signal, transmits the address information request signal through a communication network interface to an address information providing server, and generates the additional information request signal using the address information transmitted from the address information providing server.

11. The radio frequency identification system of claim 10, further comprising:
an address information providing server which provides address information for a connection to the additional information providing server.

12. The radio frequency identification system of claim 11, wherein the wireless terminal reads the tag data, requests the address information providing server for the address information, and requests the additional information providing server for the additional information using the address information provided from the address information providing server.

13. A method of providing additional information using a radio frequency identification system comprising a radio frequency identification tag, a wireless terminal comprising a radio frequency identification reader which identifies the radio frequency identification tag, and an additional information providing server connected to the wireless terminal through a communication network, the method comprising:
reading tag data from the radio frequency identification tag using the wireless terminal;
requesting additional information with respect to the read tag data using the wireless terminal;
providing the additional information from the additional information providing server to the wireless terminal; and
storing a tag data list comprising the tag data and address information of the additional information providing server corresponding to the tag data;
wherein if the tag data list does not comprise the data coinciding with the read tag data according to the result of comparing the kind of the tag data with the tag data list, generating an address information request signal to transmit the additional information request signal to an address information providing server and generating the additional information request signal using the address information transmitted from the address information providing server.

14. The method of claim 13, further comprising:
after reading the tag data, requesting address information for a connection to the address information providing server and receiving the address information from an address information providing server using the wireless terminal.

15. The method of claim 14, wherein the request for the additional information is performed using the received address information.

16. A wireless terminal for providing additional information regarding an RFID tag, comprising:
a memory which stores a tag data list comprising information as to tag data read from an RFID tag and address information of an additional information providing server corresponding to the tag data information;
a controller which extracts corresponding address information from the tag data list and generates an additional information request signal using the extracted address information if the tag data list includes data coinciding with the information as to the read tag data information; and
a communication network interface which transmits the generated additional information requesting signal through the communication network and receives the additional information in response to the requesting signal,
wherein the controller generates an address information requesting signal and transmits the requesting signal to the address information providing server through the communication network interface if the tag data list does not include data coinciding with the information as to the read tag data information, and generates an additional information requesting signal using the address information transmitted from the address information providing server.

17. The wireless terminal of claim 16, wherein the tag data information comprises one of tag data and a service code read from the RFID tag.

18. The wireless terminal of claim 16, wherein the address information of the additional information providing server is acquired from one of the RFID tag and the address information providing server.

19. A method for providing additional information of a wireless terminal, comprising:
storing a tag data list comprising information as to tag data read from an RFID tag and address information of an additional information providing server corresponding to the tag data information;
extracting corresponding address information from the tag data list if the tag data list includes data coinciding with the information as to the read tag data information;
generating an additional information request signal using the extracted address information;
generating an address information requesting signal and transmitting the requesting signal to the address information providing server if the tag data list does not include data coinciding with the information as to the read tag data information; and
generating an additional information requesting signal using the address information transmitted from the address information providing server.

20. The method of claim 19, wherein the tag data information comprises one of tag data and a service code read from the RFID tag.

21. The method of claim 19, wherein the address information of the additional information providing server is acquired from one of the RFID tag and the address information providing server.

* * * * *